United States Patent
Kawashima et al.

(10) Patent No.: US 8,410,231 B2
(45) Date of Patent: Apr. 2, 2013

(54) PRODUCTION PROCESS OF OLEFIN POLYMER

(75) Inventors: Yasutoyo Kawashima, Ichihara (JP); Tomoaki Goto, Kisarazu (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/528,421

(22) PCT Filed: Feb. 25, 2008

(86) PCT No.: PCT/JP2008/053709
§ 371 (c)(1),
(2), (4) Date: Aug. 24, 2009

(87) PCT Pub. No.: WO2008/105546
PCT Pub. Date: Sep. 4, 2008

(65) Prior Publication Data
US 2010/0029868 A1 Feb. 4, 2010

(30) Foreign Application Priority Data

Feb. 26, 2007 (JP) ................................. 2007-045157
Dec. 26, 2007 (JP) ................................. 2007-333995

(51) Int. Cl.
*C08F 4/00* (2006.01)
*C08F 4/52* (2006.01)
*B01J 31/00* (2006.01)

(52) U.S. Cl. ........................... 526/185; 526/90; 502/152

(58) Field of Classification Search .................... 526/90, 526/904, 907, 943
See application file for complete search history.

(56) References Cited

U.S. PATENT DOCUMENTS 6,867,277 B2 * 3/2005 Iseki ........................ 526/348.3
2003/0027950 A1 2/2003 Uchino et al.

FOREIGN PATENT DOCUMENTS

| JP | 2002-293817 A | | 10/2002 |
| JP | 2003-292514 A | | 10/2003 |
| JP | 2003292514 A | * | 10/2003 |
| JP | 2004-002764 A | | 1/2004 |
| JP | 2005-97481 A | | 4/2005 |
| JP | 2006176565 A | * | 7/2006 |
| WO | 02/22693 A1 | | 3/2002 |

OTHER PUBLICATIONS

English language translation of JP 2003292514.*
English Translation of JP 2006176565.*

* cited by examiner

*Primary Examiner* — David W Wu
*Assistant Examiner* — Elizabeth Eng
(74) *Attorney, Agent, or Firm* — Sughrue Mion, PLLC

(57) ABSTRACT

The present invention provides a highly active process for producing an olefin polymer, comprising:

the step (I) of preliminarily polymerizing an olefin at 65° C. or lower in the presence of a preliminary polymerization catalyst prepared by bringing the following components (A), (B) and (C) into contact with each other, to produce a preliminary polymerization catalyst component (X); and the step (II) of polymerizing an olefin in the presence of a polymerization catalyst prepared by bringing the preliminary polymerization catalyst component (X) into contact with the following component (D), to produce an olefin polymer;

component (A): a metallocene-base complex, component (B): a solid co-catalyst component in which a compound capable of ionizing the metallocene-base complex into an ionic complex is supported on fine particle support, component (C): an organoaluminum compound represented by the general formula $R^1{}_3Al$ (wherein, $R^1$ is a linear hydrocarbon group of 1 to 8 carbon atoms, wherein the $R^1$ can be the same or different), and component (D): an organoaluminum compound represented by the general formula $R^2{}_3Al$ (wherein, $R^2$ is a branched hydrocarbon group of 3 to 8 carbon atoms, wherein the $R^2$ can be the same or different).

8 Claims, No Drawings

PRODUCTION PROCESS OF OLEFIN POLYMER

BACKGROUND ART

The present invention relates to a production process of olefin polymer.

Known processes for producing olefin-base polymers, e.g., ethylene homopolymers and ethylene/α-olefin copolymers, include those carried out in the presence of a metallocene-base catalyst. These processes give polymers of higher mechanical strength, blocking capability and so forth than the conventional ones carried out in the presence of a Ziegler-Natta catalyst.

One of the known olefin production processes carried out in the presence of a metallocene-base catalyst comprises a step in which ethylene is preliminarily polymerized in the presence of a preliminary polymerization catalyst produced by bringing a metallocene-base complex, carrier and organoaluminum compound into contact with each other to produce a preliminary polymerization catalyst component; and a subsequent step in which ethylene and an α-olefin are copolymerized in a vapor-phase polymerization reactor in the presence of an organoaluminum compound of the similar species to that used in the preliminary polymerization step and the preliminary polymerization catalyst component. For example, ethylene and butene are preliminarily copolymerized in the presence of a preliminary polymerization catalyst produced by bringing into contact a metallocene-base complex, promoter carrier and triisobutyl aluminum to produce a preliminary polymerization catalyst component, and subsequently ethylene and 1-hexene are copolymerized in a vapor-phase polymerization reactor in the presence of triisobutyl aluminum and the preliminary polymerization catalyst component (Patent Document 1).

Patent Document 1: JP-A-2005-97481

DISCLOSURE OF INVENTION

However, the process carried out in the presence of the metallocene-base catalyst described above cannot necessarily exhibit a sufficiently high polymerization activity.

It is an object of the present invention, developed under the above situations, to provide an olefin polymer production process which exhibits a high polymerization activity.

More specifically, the present invention provides a process for producing an olefin polymer, comprising:

the step (I) of preliminarily polymerizing an olefin at 65° C. or lower in the presence of a preliminary polymerization catalyst prepared by bringing the following components (A), (B) and (C) into contact with each other, to produce a preliminary polymerization catalyst component (X); and the step (II) of polymerizing an olefin in the presence of a polymerization catalyst prepared by bringing the preliminary polymerization catalyst component (X) into contact with the following component (D), to produce an olefin polymer;

component (A): a metallocene-base complex, component (B): a solid co-catalyst component in which a compound capable of ionizing the metallocene-base complex into an ionic complex is supported on fine particle support, component (C): an organoaluminum compound represented by the general formula $R^1{}_3Al$ (wherein, $R^1$ is a linear hydrocarbon group of 1 to 8 carbon atoms, wherein the $R^1$ can be the same or different), and component (D): an organoaluminum compound represented by the general formula $R^2{}_3Al$ (wherein, $R^2$ is a branched hydrocarbon group of 3 to 8 carbon atoms, wherein the $R^2$ can be the same or different).

ADVANTAGES OF THE INVENTION

The present invention can provide a process of high polymerization activity for production of an olefin polymer in the presence of a metallocene-base catalyst.

BEST MODE FOR CARRYING OUT THE INVENTION

The step (I) of the present invention is the step of preliminary polymerizing an olefin at 65° C. or lower in the presence of a preliminary polymerization catalyst prepared by bringing the following components (A), (B) and (C) into contact with each other, to produce a preliminary polymerization catalyst component (X);

component (A): a metallocene-base complex, component (B): a solid co-catalyst component in which a compound capable of ionizing the metallocene-base complex into an ionic complex is supported on fine particle support, and component (C): an organoaluminum compound represented by the general formula $R^1{}_3Al$ (wherein, $R^1$ is a linear hydrocarbon group of 1 to 8 carbon atoms, wherein the $R^1$ can be the same or different).

The metallocene-base complex as the component (A) is a transition metal compound having a cyclopentadiene type anion structure, preferably a transition metal compound represented by the general formula (1) or its μ-oxo type dimer:

$$L_a M X_b \qquad (1)$$

(wherein, "a" is a numeral satisfying $0 < a \leq 8$; "b" is a numeral satisfying $0 \leq b \leq 8$; M is a transition element of groups 3 to 11 in the periodic table or of lanthanoid series; L is a group having a cyclopentadiene type anion structure, wherein plural L may be bound to each other either directly or via a residue containing carbon, silicon, nitrogen, oxygen, sulfur or phosphorus atom; and X is a halogen atom, hydrocarbon group (except for a group having a cyclopentadiene type anion structure) or hydrocarbonoxy group).

M in the general formula (1) is a transition element of groups 3 to 11 in the periodic table (IUPAC, 1989) or of lanthanoid series. More specifically, they include scandium, yttrium, titanium, zirconium, hafnium, vanadium, niobium, tantalum, chromium, iron, ruthenium, cobalt, rhodium, nickel, palladium, samarium and ytterbium. M is preferably a transition metal element of group 4, more preferably titanium, zirconium or hafnium, still more preferably zirconium.

In the general formula (1), L is a group having a cyclopentadiene type anion structure, wherein plural L may be the same or different, and bound to each other either directly or via a cross-linking group containing carbon, silicon, nitrogen, oxygen, sulfur or phosphorus atom.

The groups of L having a cyclopentadiene type anion structure include $\eta^5$-(substituted) cyclopentadienyl group, $\eta^5$-(substituted) indenyl group and $\eta^5$-(substituted) fluorenyl group. More specifically, they include $\eta^5$-cyclopentadienyl, $\eta^5$-methylcyclopentadienyl, $\eta^5$-ethylcyclopentadienyl, $\eta^5$-n-butylcyclopentadienyl, $\eta^5$-tert-butylcyclopentadienyl, $\eta^5$-1,2-dimethylcyclopentadienyl, $\eta^5$-1,3-dimethylcyclopentadienyl, $\eta^5$-1-methyl-2-ethylcyclopentadienyl, $\eta^5$-1-methyl-3-ethylcyclopentadienyl, $\eta^5$-1-tert-butyl-2-methylcyclopentadienyl, $\eta^5$-1-tert-butyl-3-methylcyclopentadienyl, $\eta^5$-1-methyl-2-isopropylcyclopentadienyl, $\eta^5$-1-methyl-3- isopropylcyclopentadienyl, $\eta^5$-1-methyl-2-n-butylcyclopentadienyl, $\eta^5$-1-methyl-3-n-butylcyclopentadienyl, $\eta^5$-1,2,3-trimethylcyclopentadienyl, $\eta^5$-1,2,4-trimethylcyclopentadienyl, $\eta^5$-tetramethylcyclopentadienyl, $\eta^5$-pentamethylcyclopentadienyl, $\eta^5$-indenyl, $\eta^5$-4,5,6,7-tetrahydroindenyl, $\eta^5$-2-methylindenyl, $\eta^5$-3-methylindenyl, $\eta^5$-4-methylindenyl, $\eta^5$-5-methylindenyl, $\eta^5$-6-methylindenyl, $\eta^5$-7-methylindenyl, $\eta^5$-2-tert-butylindenyl, $\eta^5$-3-tert-butylindenyl, $\eta^5$-4-tert-butylindenyl, $\eta^5$-5-tert-butylindenyl, $\eta^5$-6-tert-butyl-indenyl, $\eta^5$-7-tert-butylindenyl, $\eta^5$-2,3-dimethylindenyl, $\eta^5$-4,7-dimethylindenyl, $\eta^5$-2,4,7-trimethylindenyl, $\eta^5$-2-methyl-4-isopropylindenyl, $\eta^5$-4,5-benzindenyl, $\eta^5$-2-methyl-4,5-benzindenyl, $\eta^5$-4-phenylindenyl, $\eta^5$-2-methyl-5-phenylindenyl, $\eta^5$-2-methyl-4-phenylindenyl, $\eta^5$-2-methyl-4-naphthylindenyl, $\eta^5$-fluorenyl, $\eta^5$-2,7-dimethylfluorenyl and $\eta^5$-2,7-di-tert-butylfluorenyl groups, and their substitutions. In this specification, "$\eta^5$-" for transition metal compound names may be hereinafter omitted.

The groups having a cyclopentadiene type anion structure may be bound to each other either directly or via a cross-linking group containing carbon, silicon, nitrogen, oxygen, sulfur or phosphorus atom. The cross-linking groups for the present invention include alkylenes, e.g., ethylene and propylene; substituted alkylene groups, e.g., dimethylmethylene and diphenylmethylene; silylene and substituted silylene and its substitutions, e.g., dimethylsilylene, diphenylsilylene and tetramethylsilylene; and hetero atoms, e.g., nitrogen, oxygen, sulfur and phosphorus.

In the general formula (1), X is a halogen atom, hydrocarbon group (except for a group having a cyclopentadiene type anion structure) or hydrocarbonoxy group. More specifically, the halogen atoms include fluorine, chlorine, bromine and iodine. The hydrocarbon group does not include a group having a cyclopentadiene type anion structure. The hydrocarbon groups include alkyl, aralkyl, aryl and alkenyl etc. The hydrocarbonoxy groups include alkoxy, aralkyloxy and aryloxy etc.

The alkyl groups include methyl, ethyl, n-propyl, isopropyl, n-butyl, sec-butyl, tert-butyl, isobutyl, n-pentyl, neopentyl, amyl, n-hexyl, n-octyl, n-decyl, n-dodecyl, n-pentadecyl and n-eicosyl, each of which may be substituted by a halogen atom, e.g., fluorine, chlorine, bromine or iodine. The alkyl groups substituted by a halogen atom include fluoromethyl, trifluoromethyl, chloromethyl, trichloromethyl, fluoroethyl, pentafluoroethyl, perfluoropropyl, perfluorobutyl, perfluorohexyl, perfluorooctyl, perchloropropyl, perchlorobutyl and perbromopropyl. Each of these alkyl groups may be partly substituted by an alkoxy group, e.g., methoxy or ethoxy; aryloxy group, e.g., phenoxy; or aralkyloxy group, e.g., benzyloxy.

The aralkyl groups include benzyl, (2-methylphenyl)methyl, (3-methylphenyl)methyl, (4-methylphenyl)methyl, (2,3-dimethylphenyl)methyl, (2,4-dimethylphenyl)methyl, (2,5-dimethylphenyl)methyl, (2,6-dimethylphenyl)methyl, (3,4-dimethylphenyl)methyl, (3,5-dimethylphenyl)methyl, (2,3,4-trimethylphenyl)methyl, (2,3,5-trimethylphenyl)methyl, (2,3,6-trimethylphenyl)methyl, (3,4,5-trimethylphenyl)methyl, (2,4,6-trimethylphenyl)methyl, (2,3,4,5-tetramethylphenyl)methyl, (2,3,4,6-tetramethylphenyl)methyl, (2,3,5,6-tetramethylphenyl)methyl, (pentamethylphenyl)methyl, (ethylphenyl)methyl, (n-propylphenyl)methyl, (isopropylphenyl)methyl, (n-butylphenyl)methyl, (sec-butylphenyl)methyl, (tert-butylphenyl)methyl, (n-pentylphenyl)methyl, (neopentylphenyl)methyl, (n-hexylphenyl)methyl, (n-octylphenyl)methyl, (n-decylphenyl)methyl, (n-dodecylphenyl)methyl, naphthylmethyl and anthracenylmethyl groups. Each of these aralkyl groups may be partly substituted by a halogen atom, e.g., fluorine, chlorine, bromine or iodine; alkoxy group, e.g., methoxy or ethoxy; aryloxy group, e.g., phenoxy; or aralkyloxy group, e.g., benzyloxy.

The aryl groups include phenyl, 2-tolyl, 3-tolyl, 4-tolyl, 2,3-xylyl, 2,4-xylyl, 2,5-xylyl, 2,6-xylyl, 3,4-xylyl, 3,5-xylyl, 2,3,4-trimethylphenyl, 2,3,5-trimethylphenyl, 2,3,6-trimethylphenyl, 2,4,6-trimethylphenyl, 3,4,5-trimethylphenyl, 2,3,4,5-tetramethylphenyl, 2,3,4,6-tetramethylphenyl, 2,3,5,6-tetramethylphenyl, pentamethylphenyl, ethylphenyl, n-propylphenyl, isopropylphenyl, n-butylphenyl, sec-butylphenyl, tert-butylphenyl, n-pentylphenyl, neopentylphenyl, n-hexylphenyl, n-octylphenyl, n-decylphenyl, n-dodecylphenyl, n-tetradecylphenyl, naphthyl and anthracenyl groups. Each of these aryl groups may be partly substituted by a halogen atom, e.g., fluorine, chlorine, bromine or iodine; alkoxy group, e.g., methoxy or ethoxy; aryloxy group, e.g., phenoxy; or aralkyloxy group, e.g., benzyloxy.

The alkenyl groups include allyl, methallyl, crotyl and 1,3-diphenyl-2-propenyl groups.

The alkoxy groups include methoxy, ethoxy, n-propoxy, isopropoxy, n-butoxy, sec-butoxy, tert-butoxy, n-pentoxy, neopentoxy, n-hexoxy, n-octoxy, n-dodesoxy, n-pentadesoxy and-n-icosoxy groups. Each of these alkoxy groups may be partly substituted by a halogen atom, e.g., fluorine, chlorine, bromine or iodine; alkoxy group, e.g., methoxy or ethoxy; aryloxy group, e.g., phenoxy; or aralkyloxy group, e.g., benzyloxy.

The aralkyloxy groups include benzyloxy, (2-methylphenyl)methoxy, (3-methylphenyl)methoxy, (4-methylphenyl)methoxy, (2,3-dimethylphenyl)methoxy, (2,4-dimethylphenyl)methoxy, (2,5-dimethylphenyl)methoxy, (2,6-dimethylphenyl)methoxy, (3,4-dimethylphenyl)methoxy, (3,5-dimethylphenyl)methoxy, (2,3,4-trimethylphenyl)methoxy, (2,3,5-trimethylphenyl)methoxy, (2,3,6-trimethylphenyl)methoxy, (2,4,5-trimethylphenyl)methoxy, (2,4,6-trimethylphenyl)methoxy, (3,4,5-trimethylphenyl)methoxy, (2,3,4,5-tetramethylphenyl)methoxy, (2,3,4,6-tetramethylphenyl)methoxy, (2,3,5,6-tetramethylphenyl)methoxy, (pentamethylphenyl)methoxy, (ethylphenyl)methoxy, (n-propylphenyl)methoxy, (isopropylphenyl)methoxy, (n-butylphenyl)methoxy, (sec-butylphenyl)methoxy, (tert-butylphenyl)methoxy, (n-hexylphenyl)methoxy, (n-octylphenyl)methoxy, (n-decylphenyl)methoxy, naphthylmethoxy and anthracenylmethoxy groups. Each of these aralkyloxy groups may be partly substituted by a halogen atom, e.g., fluorine, chlorine, bromine or iodine; alkoxy group, e.g., methoxy or ethoxy; aryloxy group, e.g., phenoxy; or aralkyloxy group, e.g., benzyloxy.

The aryloxy groups include phenoxy, 2-methylphenoxy, 3-methylphenoxy, 4-methylphenoxy, 2,3-dimethylphenoxy, 2,4-dimethylphenoxy, 2,5-dimethylphenoxy, 2,6-dimethylphenoxy, 3,4-dimethylphenoxy, 3,5-dimethylphenoxy, 2-tert-butyl-3-methylphenoxy, 2-tert-butyl-4-methylphenoxy, 2-tert-butyl-5-methylphenoxy, 2-tert-butyl-6-methylphenoxy, 2,3,4-trimethylphenoxy, 2,3,5-trimethylphenoxy, 2,3,6-trimethylphenoxy, 2,4,5-trimethylphenoxy, 2,4,6-trimethylphenoxy, 2-tert-butyl-3,4-dimethylphenoxy, 2-tert-butyl-3,5-dimethylphenoxy, 2-tert-butyl-3,6-dimethylphenoxy, 2,6-di-tert-butyl-3-methylphenoxy, 2-tert-butyl-4,5-dimethylphenoxy, 2,6-di-tert-butyl-4-methylphenoxy, 3,4,5-trimethylphenoxy, 2,3,4,5-tetramethylphenoxy, 2-tert-butyl-3,4,5-trimethylphenoxy, 2,3,4,6-tetramethylphenoxy, 2-tert-butyl-3,4,6-trimethylphenoxy, 2,6-di-tert-butyl-3,4-dimethylphenoxy, 2,3,5,6-tetramethylphenoxy, 2-tert-butyl-3,5,6-trimethylphenoxy, 2,6-di-tert-butyl-3,5-dimethylphenoxy, pentamethylphenoxy, ethylphenoxy, n-propylphenoxy, isopropylphenoxy, n-butylphenoxy, secbutylphenoxy, tert-butylphenoxy, n-hexylphenoxy, n-octyl phenoxy, n-decyl phenoxy, n-tetradecyl phenoxy, naphthoxy, and anthracenoxy groups. Each of these aryloxy groups may be partly substituted by a halogen atom, e.g., fluorine, chlorine, bromine or iodine; alkoxy group, e.g., methoxy or ethoxy; aryloxy group, e.g., phenoxy; or aralkyloxy group, e.g., benzyloxy.

In the general formula (1), "a" is a numeral satisfying $0 < a \leqq 8$; "b" is a numeral satisfying $0 < b \leqq 8$, adequately selected depending on valence of M, wherein "a" is preferably 2 and "b" is also preferably 2 when M is a transition metal element of group 4 in the periodic table (IUPAC, 1989).

Metallocene-base complexes with two cyclopentadiene type anion structures include bis(cyclopentadienyl) titanium dichloride, bis(methylcyclopentadienyl) titanium dichloride, bis(ethylcyclopentadienyl) titanium dichloride, bis(n-butylcyclopentadienyl) titanium dichloride, bis(tert-butylcyclopentadienyl) titanium dichloride, bis(1,2-dimethylcyclopentadienyl) titanium dichloride, bis(1,3-dimethylcyclopentadienyl) titanium dichloride, bis(1-methyl-2-ethylcyclopentadienyl) titanium dichloride, bis(1-methyl-3-ethylcyclopentadienyl) titanium dichloride, bis(1-methyl-2-n-butylcyclopentadienyl) titanium dichloride, bis (1-methyl-3-n-butylcyclopentadienyl) titanium dichloride, bis(1-methyl-2-isopropylcyclopentadienyl) titanium dichloride, bis(1-methyl-3-isopropylcyclopentadienyl) titanium dichloride, bis(1-tert-butyl-2-methylcyclopentadienyl) titanium dichloride, bis(1-tert-butyl-3-methylcyclopentadienyl) titanium dichloride, bis(1,2,3-trimethylcyclopentadienyl) titanium dichloride, bis(1,2,4-trimethylcyclopentadienyl) titanium dichloride, bis(tetramethylcyclopentadienyl) titanium dichloride, bis(pentamethylcyclopentadienyl) titanium dichloride, bis(indenyl) titanium dichloride, bis(4,5,6,7-tetrahydroindenyl) titanium dichloride, bis(fluorenyl) titanium dichloride, bis(2-phenylindenyl) titanium dichloride, bis[2-(bis-3,5-trifluoromethylphenyl)indenyl] titanium dichloride, bis[2-(4-tert-butylphenyl)indenyl] titanium dichloride, bis[2-(4-trifluoromethylphenyl)indenyl] titanium dichloride, bis[2-(4-methylphenyl)indenyl] titanium dichloride, bis[2-(3,5-dimethylphenyl)indenyl] titanium dichloride, bis[2-(pentafluorophenyl)indenyl] titanium dichloride, cyclopentadienyl(pentamethylcyclopentadienyl) titanium dichloride, cyclopentadienyl(indenyl) titanium dichloride, cyclopentadienyl(fluorenyl) titanium dichloride, indenyl (fluorenyl) titanium dichloride, pentamethylcyclopentadienyl(indenyl) titanium dichloride, pentamethylcyclopentadienyl(fluorenyl) titanium dichloride, cyclopentadienyl(2-phenylindenyl) titanium dichloride, pentamethylcyclopentadienyl(2-phenylindenyl) titanium dichloride, these compounds with titanium replaced by zirconium or hafnium, and these compounds with dichloride replaced by difluoride, dibromide, diiodide, dimethyl, diethyl, diisopropyl, diphenyl, dibenzyl, dimethoxide, diethoxide, di(n-propoxide), di(isopropoxide), diphenoxide or (di(pentafluorophenoxide).

Metallocene-base complexes with two cyclopentadiene type anion structures bound to each other via a cross-linking group include dimethylsilylenebis(cyclopentadienyl) titanium dichloride, dimethylsilylenebis(2-methylcyclopentadienyl) titanium dichloride, dimethylsilylenebis(3-methylcyclopentadienyl) titanium dichloride, dimethylsilylenebis(2-n-butylcyclopentadienyl) titanium dichloride, dimethylsilylenebis(3-n-butylcyclopentadienyl) titanium dichloride, dimethylsilylenebis(2,3-dimethylcyclopentadienyl) titanium dichloride, dimethylsilylenebis(2,4-dimethylcyclopentadienyl) titanium dichloride, dimethylsilylenebis (2,5-dimethylcyclopentadienyl) titanium dichloride, dimethylsilylenebis(3,4-dimethylcyclopentadienyl) titanium dichloride, dimethylsilylenebis(2,3-ethylmethylcyclopentadienyl) titanium dichloride, dimethylsilylenebis(2,4-ethylmethylcyclopentadienyl) titanium dichloride, dimethylsilylenebis(2,5-ethylmethylcyclopentadienyl) titanium dichloride, dimethylsilylenebis(3,5-ethylmethylcyclopentadienyl) titanium dichloride, dimethylsilylenebis(2,3,4-trimethylcyclopentadienyl) titanium dichloride, dimethylsilylenebis(2,3,5-trimethylcyclopentadienyl) titanium dichloride, dimethylsilylenebis(tetramethylcyclopentadienyl) titanium dichloride, dimethylsilylenebis(indenyl) titanium dichloride, dimethylsilylenebis(2-methylindenyl) titanium dichloride, dimethylsilylenebis(2-tert-butylindenyl) titanium dichloride, dimethylsilylenebis(2,3-dimethylindenyl) titanium dichloride, dimethylsilylenebis(2,4,7-trimethylindenyl) titanium dichloride, dimethylsilylenebis(2-methyl-4-isopropylindenyl) titanium dichloride, dimethylsilylenebis(4,5-benzindenyl) titanium dichloride, dimethylsilylenebis(2-methyl-4,5-benzindenyl) titanium dichloride, dimethylsilylenebis(2-phenylindenyl) titanium dichloride, dimethylsilylenebis(4-phenylindenyl) titanium dichloride, dimethylsilylenebis(2-methyl-4-phenylindenyl) titanium dichloride, dimethylsilylenebis(2-methyl-5-phenylindenyl) titanium dichloride, dimethylsilylenebis(2-methyl-4-naphthylindenyl) titanium dichloride, dimethylsilylenebis(4,5,6,7-tetrahydroindenyl) titanium dichloride, dimethylsilylene(cyclopentadienyl)(indenyl) titanium dichloride, dimethylsilylene (methylcyclopentadienyl)(indenyl) titanium dichloride, dimethylsilylene(n-butylcyclopentadienyl)(indenyl) titanium dichloride, dimethylsilylene(tetramethylcyclopentadienyl)(indenyl) titanium dichloride, dimethylsilylene(cyclopentadienyl)(fluorenyl) titanium dichloride, dimethylsilylene (methylcyclopentadienyl)(fluorenyl) titanium dichloride, dimethylsilylene(n-butylcyclopentadienyl)(fluorenyl) titanium dichloride, dimethylsilylene(tetramethylcyclopentadienyl) (fluorenyl) titanium dichloride, dimethylsilylene(indenyl) (fluorenyl) titanium dichloride, dimethylsilylenebis (fluorenyl) titanium dichloride, dimethylsilylene (cyclopentadienyl) (tetramethylcyclopentadienyl) titanium dichloride, dimethylsilylene(tetramethylcyclopentadienyl) (fluorenyl) titanium dichloride, these compounds with titanium replaced by zirconium or hafnium, these compounds with dimethylsilylene replaced by methylene, ethylene, dimethylmethylene (isopropylidene) diphenylmethylene, diethylsilylene, diphenylsilylene or dimethoxysilylene, and these compounds with dichloride replaced by difluoride, dibromide, diiodide, dimethyl, diethyl, diisopropyl, diphenyl, dibenzyl, dimethoxide, diethoxide, di(n-propoxide), di(isopropoxide), diphenoxide or di(pentafluorophenoxide).

Metallocene-base complexes with one cyclopentadiene type anion structure include cyclopentadienyl titanium trichloride, pentamethylcyclopentadienyl titanium trichloride, cyclopentadienyl(dimethylamide) titanium dichloride, cyclopentadienyl (phenoxy) titanium dichloride, cyclopentadienyl (2,6-dimethylphenyl) titanium dichloride, cyclopentadienyl (2,6-diisopropylphenyl) titanium dichloride, cyclopentadienyl (2,6-di-tert-butylphenyl) titanium dichloride, pentamethylcyclopentadienyl (2,6-di-methylphenyl) titanium dichloride, pentamethylcyclopentadienyl (2,6-diisopropylphenyl) titanium dichloride, pentamethylcyclopentadienyl (2,6-tert-butylphenyl) titanium dichloride, indenyl(2,6-diisopropylphenyl) titanium dichloride, fluorenyl(2,6-diisopropylphenyl) titanium dichloride, dimethylsilylene (cyclopentadienyl)(2-phenoxy) titanium dichloride, dimethylsilylene(cyclopentadienyl)(3-methyl-2-phenoxy) titanium dichloride, dimethylsilylene(cyclopentadienyl)(3,5-dimethyl-2-phenoxy) titanium dichloride, dimethylsilylene (cyclopentadienyl)(3-tert-butyl-2-phenoxy) titanium dichloride, dimethylsilylene(cyclopentadienyl)(3-tert-butyl-5-methyl-2-phenoxy) titanium dichloride, dimethylsilylene (cyclopentadienyl)(3,5-di-tert-butyl-2-phenoxy) titanium dichloride, dimethylsilylene(cyclopentadienyl)(5-methyl-3-phenyl-2-phenoxy) titanium dichloride, dimethylsilylene(cyclopentadienyl)(3-tert-butyldimethylsilyl-5-methyl-2-phenoxy) titanium dichloride, dimethylsilylene (cyclopentadienyl)(5-methyl-3-trimethylsilyl-2-phenoxy) titanium dichloride, dimethylsilylene(cyclopentadienyl)(3-tert-butyl-5-methoxy-2-phenoxy) titanium dichloride, dimethylsilylene(cyclopentadienyl)(3-tert-butyl-5-chloro-2-phenoxy) titanium dichloride, dimethylsilylene (cyclopentadienyl)(3,5-diamyl-2-phenoxy) titanium dichloride, dimethylsilylene(cyclopentadienyl)(3-phenyl-2-phenoxy) titanium dichloride, dimethylsilylene(cyclopentadienyl)(1-naphthoxy-2-yl) titanium dichloride, dimethylsilylene(methylcyclopentadienyl)(2-phenoxy) titanium dichloride, dimethylsilylene(methylcyclopentadienyl)(3-methyl-2-phenoxy) titanium dichloride, dimethylsilylene (methylcyclopentadienyl)(3,5-dimethyl-2-phenoxy) titanium dichloride, dimethylsilylene(methylcyclopentadienyl) (3-tert-butyl-2-phenoxy) titanium dichloride, dimethylsilylene(methylcyclopentadienyl)(3-tert-butyl-5-methyl-2-phenoxy) titanium dichloride, dimethylsilylene (methylcyclopentadienyl)(3,5-di-tert-butyl-2-phenoxy) titanium dichloride, dimethylsilylene(methylcyclopentadienyl) (5-methyl-3-phenyl-2-phenoxy) titanium dichloride, dimethylsilylene(methylcyclopentadienyl)(3-tert-butyldimethylsilyl-5-methyl-2-phenoxy) titanium dichloride, dimethylsilylene(methylcyclopentadienyl)(5-methyl-3-trimethylsilyl-2-phenoxy) titanium dichloride, dimethylsilylene (methylcyclopentadienyl)(3-tert-butyl-5-methoxy-2-phenoxy) titanium dichloride, dimethylsilylene (methylcyclopentadienyl)(3-tert-butyl-5-chloro-2-phenoxy) titanium dichloride, dimethylsilylene(methylcyclopentadienyl)(3,5-diamyl-2-phenoxy) titanium dichloride, dimethylsilylene(methylcyclopentadienyl)(3-phenyl-2-phenoxy) titanium dichloride, dimethylsilylene(methylcyclopentadienyl) (1-naphthoxy-2-yl) titanium dichloride, dimethylsilylene(n-butylcyclopentadienyl)(2-phenoxy) titanium dichloride, dimethylsilylene(n-butylcyclopentadienyl)(3-methyl-2-phenoxy) titanium dichloride, dimethylsilylene(n-butylcyclopentadienyl)(3,5-dimethyl-2-phenoxy) titanium dichloride, dimethylsilylene(n-butylcyclopentadienyl)(3-tert-butyl-2-phenoxy) titanium dichloride, dimethylsilylene(n-butylcyclopentadienyl)(3-tert-butyl-5-methyl-2-phenoxy) titanium dichloride, dimethylsilylene(n-butylcyclopentadienyl)(3,5-di-tert-butyl-2-phenoxy) titanium dichloride, dimethylsilylene(n-butylcyclopentadienyl)(5-methyl-3-phenyl-2-phenoxy) titanium dichloride, dimethylsilylene(n-butylcyclopentadienyl)(3-tert-butyldimethylsilyl-5-methyl-2-phenoxy) titanium dichloride, dimethylsilylene(n-butylcyclopentadienyl)(5-methyl-3-trimethylsilyl-2-phenoxy) titanium dichloride, dimethylsilylene(n-butylcyclopentadienyl)(3-tert-butyl-5-methoxy-2-phenoxy) titanium dichloride, dimethylsilylene(n-butylcyclopentadienyl)(3-tert-butyl-5-chloro-2-phenoxy) titanium dichloride, dimethylsilylene(n-butylcyclopentadienyl)(3,5-diamyl-2-phenoxy) titanium dichloride, dimethylsilylene(n-butylcyclopentadienyl)(3-phenyl-2-phenoxy) titanium dichloride, dimethylsilylene(n-butylcyclopentadienyl)(1-naphthoxy-2-yl) titanium dichloride, dimethylsilylene(tert-butylcyclopentadienyl)(2-phenoxy) titanium dichloride, dimethylsilylene (tert-butylcyclopentadienyl)(3-methyl-2-phenoxy) titanium dichloride, dimethylsilylene(tert-butylcyclopentadienyl)(3,5-dimethyl-2-phenoxy) titanium dichloride, dimethylsilylene(tert-butylcyclopentadienyl)(3-tert-butyl-2-phenoxy) titanium dichloride, dimethylsilylene(tert-butylcyclopentadienyl)(3-tert-butyl-5-methyl-2-phenoxy) titanium dichloride, dimethylsilylene(tert-butylcyclopentadienyl)(3,5-di-tert-butyl-2-phenoxy) titanium dichloride, dimethylsilylene (tert-butylcyclopentadienyl)(5-methyl-3-phenyl-2-phenoxy) titanium dichloride, dimethylsilylene(tert-butylcyclopentadienyl)(3-tert-butyldimethylsilyl-5-methyl-2-phenoxy) titanium dichloride, dimethylsilylene(tert-butylcyclopentadienyl)(5-methyl-3-trimethylsilyl-2-phenoxy) titanium dichloride, dimethylsilylene(tert-butylcyclopentadienyl)(3-tert-butyl-5-methoxy-2-phenoxy) titanium dichloride, dimethylsilylene(tert-butylcyclopentadienyl)(3-tert-butyl-5-chloro-2-phenoxy) titanium dichloride, dimethylsilylene (tert-butylcyclopentadienyl)(3,5-diamyl-2-phenoxy) titanium dichloride, dimethylsilylene(tert-butylcyclopentadienyl)(3-phenyl-2-phenoxy) titanium dichloride, dimethylsilylene(tert-butylcyclopentadienyl)(1-naphthoxy-2-yl) titanium dichloride, dimethylsilylene (tetramethylcyclopentadienyl)(2-phenoxy) titanium dichloride, dimethylsilylene(tetramethylcyclopentadienyl) (3-methyl-2-phenoxy) titanium dichloride, dimethylsilylene (tetramethylcyclopentadienyl)(3,5-dimethyl-2-phenoxy) titanium dichloride, dimethylsilylene(tetramethylcyclopentadienyl)(3-tert-butyl-2-phenoxy) titanium dichloride, dimethylsilylene(tetramethylcyclopentadienyl)(3-tert-butyl-5-methyl-2-phenoxy) titanium dichloride, dimethylsilylene (tetramethylcyclopentadienyl)(3,5-di-tert-butyl-2-phenoxy) titanium dichloride, dimethylsilylene(tetramethylcyclopentadienyl)(5-methyl-3-phenyl-2-phenoxy) titanium dichloride, dimethylsilylene(tetramethylcyclopentadienyl)(3-tert-butyldimethylsilyl-5-methyl-2-phenoxy) titanium dichloride, dimethylsilylene(tetramethylcyclopentadienyl) (5-methyl-3-trimethylsilyl-2-phenoxy) titanium dichloride, dimethylsilylene(tetramethylcyclopentadienyl)(3-tert-butyl-5-methoxy-2-phenoxy) titanium dichloride, dimethylsilylene(tetramethylcyclopentadienyl)(3-tert-butyl-5-chloro-2-phenoxy) titanium dichloride, dimethylsilylene (tetramethylcyclopentadienyl)(3,5-diamyl-2-phenoxy) titanium dichloride, dimethylsilylene(tetramethylcyclopentadienyl)(3-phenyl-2-phenoxy) titanium dichloride, dimethylsilylene(tetramethylcyclopentadienyl)(1-naphthoxy-2-yl) titanium dichloride, dimethylsilylene(trimethylsilylcyclopentadienyl)(2-phenoxy) titanium dichloride, dimethylsilylene(trimethylsilylcyclopentadienyl)(3-methyl-2-phenoxy) titanium dichloride, dimethylsilylene (trimethylsilylcyclopentadienyl)(3,5-dimethyl-2-phenoxy) titanium dichloride, dimethylsilylene(trimethylsilylcyclopentadienyl)(3-tert-butyl-2-phenoxy) titanium dichloride, dimethylsilylene(trimethylsilylcyclopentadienyl)(3-tert-butyl-5-methyl-2-phenoxy) titanium dichloride, dimethylsilylene(trimethylsilylcyclopentadienyl)(3,5-di-tert-butyl-2-phenoxy) titanium dichloride, dimethylsilylene (trimethylsilylcyclopentadienyl)(5-methyl-3-phenyl-2-phenoxy) titanium dichloride, dimethylsilylene (trimethylsilylcyclopentadienyl)(3-tert-butyldimethylsilyl-5-methyl-2-phenoxy) titanium dichloride, dimethylsilylene (trimethylsilylcyclopentadienyl)(5-methyl-3-trimethylsilyl-2-phenoxy) titanium dichloride, dimethylsilylene (trimethylsilylcyclopentadienyl)(3-tert-butyl-5-methoxy-2-phenoxy) titanium dichloride, dimethylsilylene (trimethylsilylcyclopentadienyl)(3-tert-butyl-5-chloro-2-phenoxy) titanium dichloride, dimethylsilylene (trimethylsilylcyclopentadienyl)(3,5-diamyl-2-phenoxy) titanium dichloride, dimethylsilylene(trimethylsilylcyclopentadienyl)(3-phenyl-2-phenoxy) titanium dichloride, dimethylsilylene(trimethylsilylcyclopentadienyl)(1-naphthoxy- 2-yl) titanium dichloride, dimethylsilylene(indenyl)(2-phenoxy) titanium dichloride, dimethylsilylene(indenyl)(3-methyl-2-phenoxy) titanium dichloride, dimethylsilylene (indenyl)(3,5-dimethyl-2-phenoxy) titanium dichloride, dimethylsilylene(indenyl)(3-tert-butyl-2-phenoxy) titanium dichloride, dimethylsilylene(indenyl)(3-tert-butyl-5-methyl-2-phenoxy) titanium dichloride, dimethylsilylene(indenyl) (3,5-di-tert-butyl-2-phenoxy) titanium dichloride, dimethylsilylene(indenyl)(5-methyl-3-phenyl-2-phenoxy) titanium dichloride, dimethylsilylene(indenyl)(3-tert-butyldimethylsilyl-5-methyl-2-phenoxy) titanium dichloride, dimethylsilylene(indenyl)(5-methyl-3-trimethylsilyl-2-phenoxy) titanium dichloride, dimethylsilylene(indenyl)(3-tert-butyl-5-methoxy-2-phenoxy) titanium dichloride, dimethylsilylene (indenyl)(3-tert-butyl-5-chloro-2-phenoxy) titanium dichloride, dimethylsilylene(indenyl)(3,5-diamyl-2-phenoxy) titanium dichloride, dimethylsilylene(indenyl)(3-phenyl-2-phenoxy) titanium dichloride, dimethylsilylene(indenyl)(1-naphthoxy-2-yl) titanium dichloride, dimethylsilylene(fluorenyl)(2-phenoxy) titanium dichloride, dimethylsilylene(fluorenyl)(3-methyl-2-phenoxy) titanium dichloride, dimethylsilylene(fluorenyl)(3,5-dimethyl-2-phenoxy) titanium dichloride, dimethylsilylene(fluorenyl)(3-tert-butyl-2-phenoxy) titanium dichloride, dimethylsilylene (fluorenyl)(3-tert-butyl-5-methyl-2-phenoxy) titanium dichloride, dimethylsilylene(fluorenyl)(3,5-di-tert-butyl-2-phenoxy) titanium dichloride, dimethylsilylene(fluorenyl) (5-methyl-3-phenyl-2-phenoxy) titanium dichloride, dimethylsilylene(fluorenyl)(3-tert-butyldimethylsilyl-5-methyl-2-phenoxy) titanium dichloride, dimethylsilylene(fluorenyl) (5-methyl-3-trimethylsilyl-2-phenoxy) titanium dichloride, dimethylsilylene(fluorenyl)(3-tert-butyl-5-methoxy-2-phenoxy) titanium dichloride, dimethylsilylene(fluorenyl)(3-tert-butyl-5-chloro-2-phenoxy) titanium dichloride, dimethylsilylene(fluorenyl)(3,5-diamyl-2-phenoxy) titanium dichloride, dimethylsilylene(fluorenyl)(3-phenyl-2-phenoxy) titanium dichloride, dimethylsilylene(fluorenyl)(1-naphthoxy-2-yl) titanium dichloride, (tert-butylamide)tetramethylcyclopentadienyl-1,2-ethanediyl titanium dichloride, (methylamide)tetramethylcyclopentadienyl-1,2-ethanediyl titanium dichloride, (ethylamide)tetramethylcyclopentadienyl-1,2-ethanediyl titanium dichloride, (tert-butylamide)tetramethylcyclopentadienyldimethylsilane titanium dichloride, (benzylamide)tetramethylcyclopentadienyldimethylsilane titanium dichloride, (phenylphosphide)tetramethylcyclopentadienyldimethylsilane titanium dichloride, (tert-butylamide)indenyl-1,2-ethanediyl titanium dichloride, (tert-butylamide)tetrahydroindenyl-1,2-ethanediyl titanium dichloride, (tert-butylamide)fluorenyl-1,2-ethanediyl titanium dichloride, (tert-butylamide)indenyldimethylsilane titanium dichloride, (tert-butylamide) tetrahydroindenyldimethylsilane titanium dichloride, (tert-butylamide)fluorenyldimethylsilane titanium dichloride, (dimethylaminomethyl)tetramethylcyclopentadienyl titanium (III) dichloride, (dimethylaminoethyl)tetramethylcyclopentadienyl titanium (III) dichloride, (dimethylaminopropyl)tetramethylcyclopentadienyl titanium (III) dichloride, (N-pyrrolidynyl)tetramethylcyclopentadienyl titanium dichloride, (B-dimethylaminoborabenzene)cyclopentadienyl titanium dichloride, cyclopentadienyl(9-mesitylboraanthracenyl) titanium dichloride, these compounds with titanium replaced by zirconium or hafnium, these compounds with (2-phenoxy) replaced by (3-phenyl-2-phenoxy), (3-trimethylsilyl-2-phenoxy) or (3-tert-butyldimethylsilyl-2-phenoxy), these compounds with dimethylsilylene replaced by methylene, ethylene, dimethylmethylene (isopropylidene) diphenylmethylene, diethylsilylene, diphenylsilylene or dimethoxysilylene, these compounds with dichloride replaced by difluoride, dibromide, diiodide, dimethyl, diethyl, diisopropyl, diphenyl, dibenzyl, dimethoxide, diethoxide, di(n-propoxide), di(isopropoxide), diphenoxide or di(pentafluorophenoxide), these compounds with trichloride replaced by trifluoride, tribromide, triiodide, trimethyl, triethyl, triisopropyl, triphenyl, tribenzyl, trimethoxide, triethoxide, tri(n-propoxide), tri(isopropoxide), triphenoxide or tri(pentafluorophenoxide).

The specific examples of μ-oxo type transition metal compounds represented by the general formula (1) include μ-oxobis[isopropylidene(cyclopentadienyl)(2-phenoxy) titanium chloride], μ-oxobis[isopropylidene(cyclopentadienyl)(3-tert-butyl-5-methyl-2-phenoxy) titanium chloride], μ-oxobis [isopropylidene(methylcyclopentadienyl)(2-phenoxy) titanium chloride], μ-oxobis[isopropylidene (methylcyclopentadienyl)(3-tert-butyl-5-methyl-2-phenoxy) titanium chloride], μ-oxobis[isopropylidene(tetramethylcyclopentadienyl)(2-phenoxy) titanium chloride], μ-oxobis [isopropylidene(tetramethylcyclopentadienyl)(3-tert-butyl-5-methyl-2-phenoxy) titanium chloride], μ-oxobis [dimethylsilylene](cyclopentadienyl)(2-phenoxy) titanium chloride], μ-oxobis[dimethylsilylene(cyclopentadienyl)(3-tert-butyl-5-methyl-2-phenoxy) titanium chloride], μ-oxobis [dimethylsilylene](methylcyclopentadienyl)(2-phenoxy) titanium chloride], μ-oxobis[dimethylsilylene(methylcyclopentadienyl)(3-tert-butyl-5-methyl-2-phenoxy) titanium chloride], μ-oxobis[dimethylsilylene](tetramethylcyclopentadienyl)(2-phenoxy) titanium chloride], μ-oxobis[dimethylsilylene(tetramethylcyclopentadienyl)(3-tert-butyl-5-methyl-2-phenoxy) titanium chloride], and these compounds with chloride replaced by fluoride, bromide, iodide, methyl, ethyl, isopropyl, phenyl, benzyl, methoxide, ethoxide, n-propoxide, isopropoxide, phenoxide or pentafluorophenoxide.

The metallocene complex as the component (A) preferably has two cyclopentadiene type anion structures bound to each other via a cross-linking group, e.g., alkylene or silylene.

The metallic atoms for the metallocene complexes having two cyclopentadiene type anion structures bound to each other via a cross-linking group, e.g., alkylene or silylene, are preferably the group 4 metals in the periodic table, more preferably zirconium and hafnium. The cyclopentadienyl type anion structure is preferably indenyl, methylindenyl, methylcyclopentadienyl or dimethylcyclopentadienyl group. The cross-linking group is preferably ethylene, dimethylmethylene or dimethylsilylene. The other substituent which the metal atom has is preferably diphenoxy or dialkoxy. Ethylenebis(1-indenyl) zirconium phenoxide can be cited as the more preferable metallocene-base complex.

The metallocene complex as the component (A) can be a combination of two or more kinds of complex.

As the compounds for the component (B) which ionizes the metallocene complex into the ionic complex, at least one compound selected from the group consisting of boron compounds, zinc compounds and organoaluminum oxy compounds can be cited.

As the boron compounds, tris(pentafluorophenyl)borane, triphenylcarbeniumtetrakis(pentafluorophenyl)borate, tri(n-butyl)ammoniumtetrakis(pentafluorophenyl)borate and N,N-dimethylaniliniumtetrakis(pentafluorophenyl)borate can be cited.

As the zinc compounds, a product produced by bringing diethyl zinc in contact with fluorinated phenol and water can be sited.

As the organoaluminum oxy compounds, methyl aluminoxane and methylisobutyl aluminoxane can be sited. These compounds may be produced by a method of drying a commercial organoaluminum oxy compound under a vacuum such as a method disclosed by JP-A-2003-128718, or a method of washing the solid produced under a vacuum with a hydrocarbon solvent.

The compound for ionizing the metallocene complex into the ionic complex is preferably a boron or zinc compound.

The fine particle support (fine particulate carrier) for the component (B) is preferably a porous one. These carriers include those of inorganic oxide, e.g., $SiO_2$, $Al_2O_3$, MgO, $ZrO_2$, $TiO_2$, $B_2O_3$, CaO, ZnO, BaO and $ThO_2$; clays and clay minerals, e.g., smectite, montmorillonite, hectorite, raponite and saponite; and organic polymers, e.g., polyethylene, polypropylene and styrene-divinyl benzene copolymer. The fine particulate carrier has a 50% volume-average particle diameter of normally 10 to 500 μm, which can be determined by light scattering laser diffractometry or the like. It has a pore volume of normally 0.3 to 10 mL/g, and specific surface area of normally 10 to 1000 $m^2$/g. The pore volume and specific surface area are determined by gas adsorption method; the former by the BJH method for determining quantity of gas desorbed and the latter by the BET method for determining quantity of gas adsorbed.

The fine particulate carrier is preferably dried, preferably under heating, to be substantially free of moisture. The drying temperature is preferably normally 100 to 1500° C. for the carrier with moisture not confirmed visually, preferably 100 to 1000° C., more preferably 200 to 800° C. The drying time is not limited, but preferably 10 minutes to 50 hours, more preferably 1 to 30 hours. Some of the methods for drying the carrier under heating include heating in an inert gas (e.g., nitrogen or argon) flowing at a constant rate, or heating under a vacuum.

The solid co-catalyst component for the component (B) is a compound supported by the fine particulate carrier for ionizing the metallocene complex into the ionized complex. The method for supporting the co-catalyst component is not limited so long as it brings the compound for ionizing the metallocene complex into contact with the carrier, in which the above compound may be produced in the presence of the carrier.

The treatment of bringing the compound into contact with the carrier is preferably carried out in an inert gas atmosphere. The treatment temperature is normally −100 to 300° C., preferably −80 to 200° C. The treatment time is normally 1 minute to 200 hours, preferably 10 minutes to 100 hours. The treatment may be carried out in the presence of a solvent, or by direct contact of the compound and carrier in the absence of a solvent.

The solvent for the contacting treatment is inert to the compound for ionizing the metallocene complex into the ionized complex, normally selected from hydrocarbon solvents, such as aliphatic compounds, e.g., butane, pentane, hexane, heptane, octane, 2,2,4-trimethylpentane and cyclohexane; and aromatic compounds, e.g., benzene, toluene and xylene.

Some of the more preferable component (B) examples include a support (carrier) produced by bringing diethyl zinc (component (a)), fluorinated phenol (component (b)), water (component (c)), fine inorganic particulate carrier (component (d)) and alkyl disilazane (component (e)) into contact with each other.

The preferable compounds for the component (b) include 3,4,5-trifluorophenol, 3,4,5-tris(trifluoromethyl)phenol, 3,4,5-tris(pentafluorophenyl)phenol, 3,5-difluoro-4-pentafluorophenylphenol and 4,5,6,7,8-pentafluoro-2-naphthol.

Of these, 3,4,5-trifluorophenol and 4,5,6,7,8-pentafluoro-2-naphthol are more preferable, and 3,4,5-trifluorophenol is still more preferable.

The fine inorganic particulate carrier as the component (d) is preferably silica gel.

As an alkyl disilazane for the component (e), 1,1,1,3,3,3-hexamethyl disilazane can be cited.

The composition of the (a) diethyl zinc, (b) fluorinated phenol and (c) water preferably satisfies the following relations:

$$|2-y-2z| \leq 1 \quad (2)$$

$$z \geq -2.5y+2.48 \quad (3)$$

$$y<1 \quad (4)$$

(wherein, the component (a)/component (b)/component (c) molar ratio is 1/y/z, and "y" and "z" are numerals larger than zero).

The molar ratios "y" and "z" are not limited, so long as they satisfy the formulae (2), (3) and (4). When "z" is smaller than the right side value of the formula (3), the polymerization activity may be insufficient. When "y" is larger than the right side value of the formula (4), the polymerization activity may be also insufficient. More specifically, "y" is normally 0.55 to 0.99, preferably 0.55 to 0.95, more preferably 0.6 to 0.9, most preferably 0.7 to 0.8.

The fine inorganic particulate carrier (d)/diethyl zinc (a) molar ratio is preferably 0.1 mmol/mol or more, wherein the denominator is number of mols of atomic zinc derived from diethyl zinc and present in 1 g of the particulate carrier produced by bringing the component (a) into contact with the component (d), more preferably 0.5 to 20 mmols/mol. The trimethyl disilazane (e)/fine inorganic particulate carrier (d) molar ratio is preferably 0.1 mmol/mol or more, wherein the denominator is number of mols of trimethyl disilazane present in 1 g of the particulate carrier, more preferably 0.5 to 20 mmols/mol.

The order of contacting the component (a), component (b), component (c), component (d) and component (e) is not limited. Normally, however, the components (a) and (b) are brought into contact with each other, components (d) and (e) are brought into contact with each other, and then the product of the contacted components (a) and (b) is brought into contact with that of the contacted components (d) and (e), and finally with the component (c). Alternately, the components (d) and (e) are brought into contact with each other, the product of the contacted components (d) and (e) is brought into contact with the component (a), and the resultant product is brought into contact with the component (b) and finally with the component (c).

The contacting treatment is carried out preferably in an inert gas atmosphere. The treatment temperature is normally −100 to 300° C., preferably −80 to 200° C. The treatment time is normally 1 minute to 200 hours, preferably 10 minutes to 100 hours. The treatment may be carried out in the presence of a solvent, or by direct contact of these components in the absence of a solvent.

The solvent for the contacting treatment is inert to all of the components (a) to (e). However, when the components are contacted stepwise, as described above, a solvent which is active to a component in a step may be used in another step so long as it is inert to the component in the another step. The solvent is normally selected from hydrocarbon solvents, such as aliphatic compounds, e.g., butane, pentane, hexane, heptane, octane, 2,2,4-trimethylpentane and cyclohexane; and aromatic compounds, e.g., benzene, toluene and xylene.

The component (C) of organoaluminum compound is represented by the general formula $R^1{}_3Al$ (wherein, $R^1$ is a linear hydrocarbon group of 1 to 8 carbon atoms, wherein the $R^1$ may be the same or different). The linear hydrocarbon groups of 1 to 8 carbon atoms for $R^1$ include methyl, ethyl, n-propyl, n-butyl and n-octyl. The organoaluminum compounds for the component (C) include trimethyl aluminum, triethyl aluminum, tri-n-butyl aluminum and tri-n-octyl aluminum, of which triethyl aluminum is more preferable viewed from enhancing the polymerization activity.

The preliminary polymerization catalyst may be produced by mixing and bringing the components (A), (B) and (C) into contact with each other in an inert solvent, such as saturated aliphatic hydrocarbon compounds, e.g., propane, n-butane, isobutane, n-pentane, isopentane, n-hexane, cyclohexane and heptane. The contacting treatment temperature is normally −20 to 100° C.

Quantity of the metallocene-base complex as the component (A) is preferably $5 \times 10^{-6}$ to $5 \times 10^{-4}$ mols per gram of the solid promoter component for the contacting treatment.

The preferable molar ratio of the organoaluminum compound as the component (C) to be contacted to the metallocene-base complex (component (A)) is 0.1 to 10 as (Al/M), wherein Al is aluminum in the organoaluminum compound and M is a transition metal in the metallocene-base complex. The polymerization activity may be insufficient when the ratio is excessively low. It is more preferably 0.5 or more, and 5 or less viewed from increasing molecular weight of the polymer product.

In production of the preliminary polymerization catalyst, an organoaluminum compound other than the component (C) may be present. However, the component (C) preferably accounts for 20% by mol or more based on the total organoaluminum compounds used in the preliminary polymerization step, viewed from enhancing the polymerization activity, more preferably 50% by mol or more.

In production of the preliminary polymerization catalyst, it is preferable to bring the components (A), (B) and (C) into contact with each other in the treatment process involving the following steps (1), 2) and (3), viewed from enhancing the polymerization activity of the polymer produced:

Step (1), in which a saturated aliphatic hydrocarbon compound as a solvent containing a metallocene-base complex as the component (A) is heat-treated at 40° C. or higher, Step (2), in which the heat-treated product of the step (1) is brought into contact with and treated with a solid promoter component as the component (B), and Step (3), in which the contacting-treated product of the step (2) is brought into contact with an organoaluminum compound as the component (C).

The step (1) treats a saturated aliphatic hydrocarbon compound as a solvent, containing a metallocene-base complex as the component (A) under heating at 40° C. or higher. The saturated aliphatic hydrocarbon compound solvent containing the metallocene-base complex may be prepared by incorporating the solvent with the complex. The metallocene-base complex is normally used in the form of powder or slurry with the saturated aliphatic hydrocarbon compound.

The saturated aliphatic hydrocarbon compounds useful for preparing the solvent containing the metallocene-base complex include propane, n-butane, isobutane, n-pentane, isopentane, n-hexane, cyclohexane and heptane. They may be used either individually or in combination. The compound preferably has a boiling point of 100° C. or lower at normal pressure, more preferably 90° C. or lower. Of the above compounds, propane, n-butane, isobutane, n-pentane, isopentane, n-hexane and cyclohexane are more preferable.

The heat-treatment of the saturated aliphatic hydrocarbon compound solvent containing the metallocene-base complex may be carried out by adjusting the solvent temperature at 40° C. or higher, while it is kept stationary or stirred. The temperature is preferably 45° C. or higher viewed from enhancing moldability of the polymer, more preferably 50° C. or higher. It is preferably 100° C. or lower viewed from enhancing catalyst activity, more preferably 80° C. or lower. The heat-treatment time is normally 0.5 to 12 hours. It is preferably 1 hour or more viewed from enhancing moldability, more preferably 2 hours or more. It is preferably 6 hours or less viewed from stability of the catalyst performance, more preferably 4 hours or less.

The step (2) brings the heat-treated product of the step (1), i.e., the saturated aliphatic hydrocarbon compound solvent containing the metallocene-base complex, into contact with a solid co-catalyst (promoter) component. This step may be carried out by any method which can bring into contact the heat-treated product with the solid promoter component, normally by incorporating the solid promoter component into the heat-treated product, or by incorporating the heat-treated product and solid promoter component into the saturated aliphatic hydrocarbon compound. The solid promoter component is normally used in the form of powder or slurry with the saturated aliphatic hydrocarbon compound solvent.

The contacting treatment temperature for the step (2) is preferably 70° C. or lower, more preferably 60° C. or lower. It is also preferably 10° C. or higher, more preferably 20° C. or higher. The contacting treatment time is normally 0.1 to 2 hours.

The step (3) brings the contacting-treated product of the step (2), i.e., product of contacting the heat-treated product of the step (1) and solid promoter component, into contact with an organoaluminum compound as the component (C). This step may be carried out by any method which can bring the contacting-treated product of the step (2) into contact with the organoaluminum compound as the component (C), normally by incorporating the organoaluminum compound into the contacting-treated product of the step (2), or by incorporating the contacting-treated product of the step (2) and organoaluminum compound into the saturated aliphatic hydrocarbon compound.

The contacting treatment temperature for the step (3) is preferably 70° C. or lower, more preferably 60° C. or lower. It is also preferably 10° C. or higher viewed from efficiently expressing the preliminary polymerization activity, more preferably 20° C. or higher. The contacting treatment time is normally 0.01 to 0.5 hours.

The contacting treatment in the step (3) is carried out preferably in the presence of an olefin, which is normally one used as a raw material for the preliminary polymerization. Quantity of the olefin is preferably 0.05 to 1 g per 1 g of the solid promoter component.

The steps (1) to (3) may be carried out totally in the same preliminary polymerization reactor by incorporating the saturated aliphatic hydrocarbon compound, metallocene-base complex, solid promoter component and organoaluminum compound as the component (C) separately. Alternately, the steps (2) and (3) may be carried out in a preliminary polymerization reactor, or the step (3) may be carried out in a preliminary polymerization reactor.

In the step (1), an olefin is preliminarily polymerized in the presence of a preliminary polymerization catalyst to produce a preliminary polymerization catalyst component (X). The preliminary polymerization is carried out normally by slurry polymerization, which may be a batchwise, semi-batchwise or continuous process. Moreover, it may be carried out in the presence of a chain transfer agent, e.g., hydrogen.

Slurry polymerization, when adopted for the preliminary polymerization, is carried out in the presence of a solvent, which is normally a saturated aliphatic hydrocarbon compound, e.g., propane, n-butane, isobutane, n-pentane, isopentane, n-hexane, cyclohexane or heptane. They may be used either individually or in combination. The compound preferably has a boiling point of 100° C. or lower at normal pressure, more preferably 90° C. or lower. Of the above compounds, propane, n-butane, isobutane, n-pentane, isopentane, n-hexane and cyclohexane are more preferable.

Slurry polymerization, when adopted for the preliminary polymerization, is carried out normally at a slurry concentration of 0.1 to 600 g of the solid promoter component per 1 L of the solvent, preferably 0.5 to 300 g/L. The preliminary polymerization temperature is 65° C. or less, preferably 60° C. or less, more preferably 55° C. or less from the viewpoint of enhancing a polymerization activity. The preliminary polymerization temperature is normally −20° C. or more, preferably 0° C. or more, more preferably 10° C. or more, still more preferably 20° C. or more. The olefin partial pressure in the vapor phase of the preliminary polymerization is normally 0.001 to 2 MPa, preferably 0.01 to 1 MPa. The polymerization time is normally 2 minutes to 15 hours.

The olefins useful for the preliminary polymerization include ethylene, propylene, 1-butene, 1-pentene, 1-hexene, 1-octene, 4-methyl-1-pentene, cyclopentene and cyclohexene. They may be used either individually or in combination. Preferably, the olefin is only ethylene or a combination of ethylene and an α-olefin. More preferably, it is only ethylene, or a combination of ethylene and at least one species of α-olefin selected from the group consisting of 1-butene, 1-hexene and 1-octene.

The preliminary polymerization catalyst component (X) contains the polymer produced by the preliminary polymerization normally at 0.01 to 1000 g per 1 g of the solid promoter component, preferably 0.05 to 500 g/g, more preferably 0.1 to 200 g/g.

The step (II) for the present invention polymerizes an olefin in the presence of a polymerization catalyst prepared by bringing the preliminary polymerization catalyst component (X) into contact with an organoaluminum compound as the component (D), represented by the general formula $R^2_3Al$ (wherein, $R^2$ is a branched hydrocarbon group of 3 to 8 carbon atoms, wherein the $R^2$ may be the same or different).

The organoaluminum compound as the component (D) is represented by the general formula $R^2_3Al$ (wherein, $R^2$ is a branched hydrocarbon group of 3 to 8 carbon atoms, wherein the $R^2$s may be the same or different). As the branched hydrocarbon groups of 3 to 8 carbon atoms for $R^2$, isobutyl, sec-butyl, neopentyl, isopentyl, 2-methylpentyl can be cited. As the organoaluminum compounds for the component (D), tri (2-methylpentyl) aluminum and triisobutyl aluminum can be cited, of which triisobutyl aluminum is more preferable.

The molar ratio of the organoaluminum compound as the component (D) to be contacted in the step (II) is 1 to 10,000 as (Al/M), wherein Al is aluminum in the organoaluminum compound and M is a transition metal derived from the metallocene-base complex, preferably 1 to 5,000. When the molar ratio (Al/M) is too high, a polymerization activity may be lowered.

In the step (II), an organoaluminum compound other than the component (D) may be present. However, the component (D) preferably accounts for 80% by mol or more based on the total organoaluminum compounds used in the step (II), more preferably 90% by mol or more, from the viewpoint of enhancing a polymerization activity.

In the step (II), an electron donating compound may be used as a component (E), as required. As the preferable electron donating compounds for the component (E), triethylamine and tri-n-oxtylamine can be cited. Quantity of the electron donating compound as the component (E) is preferably 0.1% by mol or more based on aluminum for the component (D), more preferably 1% by mol or more. It is also preferably 10% by mol or less viewed from enhancing the polymerization activity.

Polymerization for the step (II) is preferably slurry or vapor-phase polymerization. A vapor-phase polymerization reactor for the vapor-phase polymerization normally has a fluidized bed type reaction tank, preferably having an expanded section. It may be equipped with a blade-type agitator in the reactor.

The preliminary polymerization catalyst component (X) may be supplied to a polymerization reaction tank normally by being carried by an inert gas (e.g., nitrogen or argon), hydrogen, ethylene or the like in the absence of moisture, or in the form of a solution or slurry with each of the components being dissolved in or diluted with a solvent.

The polymerization temperature in the step (II) is normally below melting point of the olefin polymer, preferably 0 to 150° C., more preferably 30 to 100° C. It is also preferably below 90° C., more specifically 70 to 87° C. The polymerization may be carried out in the presence of hydrogen working as a molecular weight adjustor for adjusting melting/flowability characteristics of the olefin polymer. An inert gas may be present in the gas mixture.

As the olefins for the step (II), ethylene, propylene, 1-butene, 1-pentene, 1-hexene, 1-octene, 4-methyl-1-pentene, cyclopentene and cyclohexene can be cited. They may be used either individually or in combination. Preferably, the olefin is only ethylene or a combination of ethylene and an α-olefin. More preferably, it is only ethylene, or a combination of ethylene and at least one species of α-olefin selected from the group consisting of 1-butene, 1-hexene and 1-octene.

The olefin polymer produced by the present invention is preferably an ethylene/α-olefin copolymer. As the copolymers, ethylene/propylene, ethylene/1-butene, ethylene/1-hexene and ethylene/1-octene copolymers can be cited, of which ethylene/1-butene, ethylene/1-hexene and ethylene/1-butene/1-octene copolymers are more preferable.

The olefin polymer produced by the present invention may be incorporated, as required, with one or more known additives, e.g., foaming agent, foaming aid, cross-linking agent, cross-linking aid, oxidation inhibitor, antiweatherability agent, lubricant, antiblocking agent, antistatic agent, anti-fog additive, antidroplet agent, pigment, filler and so forth.

The olefin polymer produced by the present invention may be molded by a known method, e.g., extrusion molding (inflation or T-die film molding), injection molding, compression molding or the like. Extrusion foaming molding, foaming molding at normal pressure or elevated pressure, or the like may be also employed.

The olefin polymer produced by the present invention may be molded into a shape by the above methods. The molded shapes can find use in pipes/tubes, containers, caps, films, sheets and so forth. Moreover, they may be foamed in the form of single- or multi-layer structure, suitable for footwear mid-soles, outer soles or insoles for shoes, sandals and so forth. Construction materials, e.g., insulation materials, cushioning materials and so forth are other areas they can go into.

EXAMPLES

The present invention is described by Examples and Comparative Examples.

Example 1

(1) Preparation of Solid Co-Catalyst Component

A reactor equipped with a stirrer was charged with 2.8 kg of silica (Davison, Sylopol948, 50% volume-average particle diameter: 55 µm, pore volume: 1.67 mL/g, specific surface area: 325 m²/g) and 24 kg of toluene, both heated at 300° C. in a flow of nitrogen, after the reactor was purged with nitrogen, and the mixture was stirred. It was cooled to 5° C., and then incorporated with a mixed solution of 0.9 kg of 1,1,1,3,3,3-hexamethyldisilazane and 1.4 kg of toluene dropwise in 30 minutes while the reactor was kept at 5° C., at which the resulting mixture was stirred for 1 hour. The mixture was heated to 95° C., at which it was stirred for 3 hours, and then filtered. The solid product produced was washed with 20.8 kg of toluene 6 times. It was then slurried with 7.1 kg of toluene and left to stand overnight.

The resulting slurry was incorporated with 3.46 kg of hexane solution of diethyl zinc (diethyl zinc concentration: 50% by mass) and 2.05 kg of hexane, and the mixture was stirred. It was then cooled to 5° C., and incorporated with a mixed solution of 1.55 kg of 3,4,5-trifluorophenol and 2.88 kg of toluene dropwise in 60 minutes while the reactor was kept at 5° C., at which the resulting mixture was stirred for 1 hour. The mixture was then heated to 40° C., at which it was stirred for 1 hour. It was then cooled to 5° C., and incorporated with 0.221 kg of $H_2O$ dropwise in 1.5 hours while the reactor was kept at 5° C., at which the resulting mixture was stirred for 1.5 hours. Then, it was heated to 40° C., at which it was stirred for 2 hours, and heated to 80° C., at which it was stirred for 2 hours. Then, the supernatant solution was removed at room temperature to leave behind 16 L of the remainder, to which 11.6 kg of toluene was added. The resulting mixture was heated to 95° C., at which it was stirred for 4 hours. Then, the supernatant solution was removed at room temperature to leave behind a solid product. It was washed with 20.8 kg of toluene 4 times and then with 24 L of hexane 3 times. It was dried to produce a solid component (which is hereinafter referred to as the solid promoter component (a)).

(2) Preparation of Preliminary Polymerization Catalyst Component

An autoclave (interior volume: 5 L) equipped with a stirrer was charged with 833 g of butane, after it was purged with nitrogen, to which 1.29 g of racemic ethylenebis(1-indenyl) zirconium diphenoxide was added. The resulting mixture was heated to 50° C., at which it was stirred for 75 minutes, and to which 11.8 g of the solid promoter component (a) was added. The resulting mixture was then cooled to 30° C. in 45 minutes to stabilize the system. It was then incorporated with 7.2 mmols of triethyl aluminum to initiate the polymerization in the presence of 0.15 MPa of ethylene. An ethylene/hydrogen mixed gas (hydrogen concentration: 0.25%) was continuously supplied for 30 minutes. The polymerization was further continued after the system was heated to 50° C. for the preliminary polymerization for a total of 160 minutes. On completion of the polymerization, ethylene, butane, hydrogen and so forth are removed to leave behind a solid, which was dried at room temperature to produce a preliminary polymerization catalyst component containing polyethylene at 15.6 g per 1 g of the solid promoter component (a).

(3) Production of Ethylene/α-Olefin Copolymer

A 5 L autoclave equipped with a stirrer, dried under a vacuum and purged with argon, was charged with hydrogen while it was kept under a vacuum to a hydrogen partial pressure of 0.03 MPa, and then with 135 g of 1-hexene and 1066 g of butane. It was then charged with ethylene to its partial pressure of 1.6 MPa after the system temperature was increased to 70° C., to stabilize the system. The gas composition in the system contained hydrogen at 1.8% by mol, determined by gas chromatography. The autoclave was then charged with 2 mL of a 1 mmol/mL hexane solution of triisobutyl aluminum, and then with 1 mL of a 0.1 mmols/mL hexane solution of triethylamine. It was then charged with 88.5 mg of the preliminary polymerization catalyst component produced in the step (2) in Example 1. The polymerization was carried out at 70° C. while an ethylene/hydrogen mixed gas (hydrogen concentration: 0.44% by mol) was continuously supplied to keep the total pressure and hydrogen partial pressure constant. The polymerization activity was 7247 g per 1 g of the solid promoter component (a), after the polymerization was carried out for 1 hour.

Example 2

(1) Preparation of Preliminary Polymerization Catalyst Component

An autoclave (interior volume: 5 L) equipped with a stirrer was charged with 834 g of butane, after it was purged with nitrogen, to which 1.43 g of racemic ethylenebis(1-indenyl) zirconium diphenoxide was added. The resulting mixture was heated to 50° C., at which it was stirred for 75 minutes, and to which 12.3 g of the solid promoter component (a) was added. The resulting mixture was then cooled to 30° C. in 45 minutes to stabilize the system. It was incorporated with a mixed solution of 6.4 mmols of triisobutyl aluminum and 1.4 mmols of triethyl aluminum to initiate the polymerization in the presence of 0.15 MPa of ethylene. An ethylene/hydrogen mixed gas (hydrogen concentration: 0.32%) was continuously supplied for 30 minutes. The polymerization was further continued after the system was heated to 50° C. for the preliminary polymerization for a total of 190 minutes. On completion of the polymerization, ethylene, butane, hydrogen and so forth are removed to leave behind a solid, which was dried at room temperature to produce a preliminary polymerization catalyst component containing polyethylene at 13.3 g per 1 g of the solid promoter component (a).

(2) Production of Ethylene/α-Olefin Copolymer

A 5 L autoclave equipped with a stirrer, dried under a vacuum and purged with argon, was charged with hydrogen while it was kept under a vacuum to a hydrogen partial pressure of 0.034 MPa, and then with 135 g of 1-hexene and 1065 g of butane. It was then charged with ethylene to its partial pressure of 1.6 MPa after the system temperature was increased to 70° C., to stabilize the system. The gas composition in the system contained hydrogen at 1.9% by mol, determined by gas chromatography. The autoclave was then charged with 2 mL of a 1 mmol/mL hexane solution of triisobutyl aluminum, and then with 1 mL of a 0.1 mmols/mL hexane solution of triethylamine. It was then charged with 127 mg of the preliminary polymerization catalyst component produced in the step (1) in Example 2. The polymerization was carried out at 70° C. while an ethylene/hydrogen mixed gas (hydrogen concentration: 0.35% by mol) was continuously supplied to keep the total pressure and hydrogen partial pressure constant. The polymerization activity was 8213 g per 1 g of the solid promoter component (a), after the polymerization was carried out for 1 hour.

Example 3

(1) Preparation of Preliminary Polymerization Catalyst Component

An autoclave (interior volume: 5 L) equipped with a stirrer was charged with 833 g of butane, after it was purged with nitrogen, to which 1.26 g of racemic ethylenebis(1-indenyl) zirconium diphenoxide was added. The resulting mixture was heated to 50° C., at which it was stirred for 75 minutes, and to which 11.0 g of the solid promoter component (a) was added. The resulting mixture was then incorporated with 6.9 mmols of triethyl aluminum to initiate the polymerization at 50° C. in the presence of 0.15 MPa of ethylene. An ethylene/hydrogen mixed gas (hydrogen concentration: 0.27%) was continuously supplied. The polymerization was further continued for the preliminary polymerization for a total of 120 minutes. On completion of the polymerization, ethylene, butane, hydrogen and so forth are removed to leave behind a solid, which was dried at room temperature to produce a preliminary polymerization catalyst component containing polyethylene at 17.1 g per 1 g of the solid promoter component (a).

(2) Production of Ethylene/α-Olefin Copolymer

A 5 L autoclave equipped with a stirrer, dried under a vacuum and purged with argon, was charged with hydrogen while it was kept under a vacuum to a hydrogen partial pressure of 0.03 MPa, and then with 135 g of 1-hexene and 1066 g of butane. It was then charged with ethylene to its partial pressure of 1.6 MPa after the system temperature was increased to 70° C., to stabilize the system. The gas composition in the system contained hydrogen at 1.6% by mol, determined by gas chromatography. The autoclave was then charged with 2 mL of a 1 mmol/mL hexane solution of tri-isobutyl aluminum, and then with 1 mL of a 0.1 mmols/mL hexane solution of triethylamine. It was then charged with 88.5 mg of the preliminary polymerization catalyst component produced in the step (1) in Example 3. The polymerization was carried out at 70° C. while an ethylene/hydrogen mixed gas (hydrogen concentration: 0.42% by mol) was continuously supplied to keep the total pressure and hydrogen partial pressure constant. The polymerization activity was 8355 g per 1 g of the solid promoter component (a), after the polymerization was carried out for 1 hour.

Example 4

(1) Preparation of Preliminary Polymerization Catalyst Component

An autoclave (interior volume: 5 L) equipped with a stirrer was charged with 833 g of butane, after it was purged with nitrogen, to which 1.23 g of racemic ethylenebis(1-indenyl) zirconium diphenoxide was added. The resulting mixture was heated to 50° C., at which it was stirred for 75 minutes, and to which 10.8 g of the solid promoter component (a) was added. The resulting mixture was then heated to 60° C. to stabilize the system. It was then incorporated with 6.9 mmols of triethyl aluminum to initiate the polymerization in the presence of 0.15 MPa of ethylene. An ethylene/hydrogen mixed gas (hydrogen concentration: 0.27%) was continuously supplied. The polymerization was further continued for the preliminary polymerization for a total of 80 minutes. On completion of the polymerization, ethylene, butane, hydrogen and so forth are removed to leave behind a solid, which was dried at room temperature to produce a preliminary polymerization catalyst component containing polyethylene at 18.6 g per 1 g of the solid promoter component (a).

(2) Production of Ethylene/α-Olefin Copolymer

A 5 L autoclave equipped with a stirrer, dried under a vacuum and purged with argon, was charged with hydrogen while it was kept under a vacuum to a hydrogen partial pressure of 0.03 MPa, and then with 135 g of 1-hexene and 1066 g of butane. It was then charged with ethylene to its partial pressure of 1.6 MPa after the system temperature was increased to 70° C., to stabilize the system. The gas composition in the system contained hydrogen at 1.6% by mol, determined by gas chromatography. The autoclave was then charged with 2 mL of a 1 mmol/mL hexane solution of tri-isobutyl aluminum, and then with 1 mL of a 0.1 mmols/mL hexane solution of triethylamine. It was then charged with 104 mg of the preliminary polymerization catalyst component produced in the step (1) in Example 4. The polymerization was carried out at 70° C. while an ethylene/hydrogen mixed gas (hydrogen concentration: 0.43% by mol) was continuously supplied to keep the total pressure and hydrogen partial pressure constant. The polymerization activity was 5982 g per 1 g of the solid promoter component (a), after the polymerization was carried out for 1 hour.

Comparative Example 1

(1) Preparation of Preliminary Polymerization Catalyst Component

An autoclave (interior volume: 5 L) equipped with a stirrer was charged with 833 g of butane, after it was purged with nitrogen, to which 1.18 g of racemic ethylenebis(1-indenyl) zirconium diphenoxide was added. The resulting mixture was heated to 50° C., at which it was stirred for 75 minutes, and to which 10.7 g of the solid promoter component (a) was added. The resulting mixture was then heated to 70° C. to stabilize the system. It was then incorporated with 6.6 mmols of triethyl aluminum to initiate the polymerization at 70° C. in the presence of 0.15 MPa of ethylene. An ethylene/hydrogen mixed gas (hydrogen concentration: 0.27%) was continuously supplied. The polymerization was further continued for the preliminary polymerization for a total of 70 minutes. On completion of the polymerization, ethylene, butane, hydrogen and so forth are removed to leave behind a solid, which was dried at room temperature to produce a preliminary polymerization catalyst component containing polyethylene at 18.1 g per 1 g of the solid promoter component (a).

(2) Production of Ethylene/α-Olefin Copolymer

A 5 L autoclave equipped with a stirrer, dried under a vacuum and purged with argon, was charged with hydrogen while it was kept under a vacuum to a hydrogen partial pressure of 0.03 MPa, and then with 135 g of 1-hexene and 1066 g of butane. It was then charged with ethylene to its partial pressure of 1.6 MPa after the system temperature was increased to 70° C., to stabilize the system. The gas composition in the system contained hydrogen at 1.6% by mol, determined by gas chromatography. The autoclave was then charged with 2 mL of a 1 mmol/mL hexane solution of tri-isobutyl aluminum, and then with 1 mL of a 0.1 mmols/mL hexane solution of triethylamine. It was then charged with 100 mg of the preliminary polymerization catalyst component produced in the step (1) in Comparative Example 1. The polymerization was carried out at 70° C. while an ethylene/hydrogen mixed gas (hydrogen concentration: 0.43% by mol) was continuously supplied to keep the total pressure and hydrogen partial pressure constant. The polymerization activity was 2074 g per 1 g of the solid promoter component (a), after the polymerization was carried out for 1 hour.

Comparative Example 2

(1) Preparation of Preliminary Polymerization Catalyst Component

An autoclave (interior volume: 210 L) equipped with a stirrer was charged with 80 L of butane, after it was purged with nitrogen, to which 142 mmols of racemic ethylenebis(1-indenyl) zirconium diphenoxide was added. The resulting mixture was heated to 50° C., at which it was stirred for 2 hours, to which 0.7 kg of the solid promoter component (a) was added. The resulting mixture was then cooled to 30° C. to stabilize the system. It was then incorporated with 420 mmols of tributyl aluminum to initiate the polymerization in the presence of 0.05 NL of hydrogen and ethylene, supplied to a vapor phase pressure of 0.03 MPa. Ethylene and hydrogen were continuously supplied for 30 minutes at a respective rate of 0.7 kg/hour and 0.7 L (at normal temperature and pressure)/hour. The polymerization was further continued after the system was heated to 51° C. in the presence of hydrogen and ethylene continuously supplied at a respective rate of 3.5 kg/hour and 10.5 L (at normal temperature and pressure)/hour for the preliminary polymerization for a total of 4 hours. On completion of the polymerization, ethylene, butane, hydrogen and so forth are removed to leave behind a solid, which was dried at room temperature under a vacuum to produce a preliminary polymerization catalyst component containing polyethylene at 15.9 g per 1 g of the solid promoter component (a).

(2) Production of Ethylene/α-Olefin Copolymer

A 5 L autoclave equipped with a stirrer, dried under a vacuum, was charged with hydrogen while it was kept under a vacuum to a hydrogen partial pressure of 0.03 MPa, and then with 135 g of 1-hexene and 1066 g of butane. It was then charged with ethylene to its partial pressure of 1.6 MPa after the system temperature was increased to 70° C., to stabilize the system. The gas composition in the system contained hydrogen at 1.8% by mol, determined by gas chromatography. The autoclave was then charged with 2 mL of a 1 mmol/mL hexane solution of triisobutyl aluminum, and then with 1 mL of a 0.1 mmol/mL hexane solution of triethylamine. It was then charged with 109 mg of the preliminary polymerization catalyst component produced in the step (1) in Comparative Example 2. The polymerization was carried out at 70° C. while an ethylene/hydrogen mixed gas (hydrogen concentration: 0.46% by mol) was continuously supplied to keep the total pressure and hydrogen partial pressure constant. The polymerization activity was 1636 g per 1 g of the solid promoter component (a), after the polymerization was carried out for 1 hour.

Comparative Example 3

(1) Production of Ethylene/α-Olefin Copolymer

A 5 L autoclave equipped with a stirrer, dried under a vacuum, was charged with hydrogen while it was kept under a vacuum to a hydrogen partial pressure of 0.03 MPa, and then with 135 g of 1-hexene and 1066 g of butane. It was then charged with ethylene to its partial pressure of 1.6 MPa after the system temperature was increased to 70° C., to stabilize the system. The gas composition in the system contained hydrogen at 1.8% by mol, determined by gas chromatography. The autoclave was then charged with 2 mL of a 1 mmol/mL hexane solution of triethyl aluminum, and then with 1 mL of a 0.1 mmol/mL hexane solution of triethylamine. It was then charged with 87 mg of the preliminary polymerization catalyst component produced in the step (2) in Example 1. The polymerization was carried out at 70° C. while an ethylene/hydrogen mixed gas (hydrogen concentration: 0.30% by mol) was continuously supplied to keep the total pressure and hydrogen partial pressure constant. The polymerization activity was 1990 g per 1 g of the solid promoter component (a), after the polymerization was carried out for 1 hour.

Comparative Example 4

(1) Production of Ethylene/α-Olefin Copolymer

A 5 L autoclave equipped with a stirrer, dried under a vacuum, was charged with hydrogen while it was kept under a vacuum to a hydrogen partial pressure of 0.03 MPa, and then with 135 g of 1-hexene and 1066 g of butane. It was then charged with ethylene to its partial pressure of 1.6 MPa after the system temperature was increased to 70° C., to stabilize the system. The gas composition in the system contained hydrogen at 1.8% by mol, determined by gas chromatography. The autoclave was then charged with 2 mL of a 1 mmol/mL hexane solution of triethyl aluminum, and then with 1 mL of a 0.1 mmol/mL hexane solution of triethylamine. It was then charged with 81 mg of the preliminary polymerization catalyst component produced in the step (1) in Comparative Example 1. The polymerization was carried out at 70° C. while an ethylene/hydrogen mixed gas (hydrogen concentration: 0.30% by mol) was continuously supplied to keep the total pressure and hydrogen partial pressure constant. The polymerization activity was 2606 g per 1 g of the solid promoter component (a), after the polymerization was carried out for 1 hour.

TABLE 1

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Step (I) | | | | | | | | | |
| TEA | mol/mol*) | 3 | 0.6 | 3 | 3 | 3 | — | 3 | — |
| TIBA | mol/mol*) | — | 2.4 | — | — | — | 3 | — | 3 |
| Polymerization temperature | ° C. | 30→50 | 30→50 | 50 | 60 | 70 | 30→50 | 30→50 | 30→50 |
| Step (II) | | | | | | | | | |
| TEA | mol/mol*) | — | — | — | — | — | — | 1863 | 1744 |
| TIBA | mol/mol*) | 1831 | 1034 | 1853 | 1766 | 1849 | 1529 | — | — |
| Polymerization activity | g/g · hr | 7247 | 8213 | 8355 | 5982 | 2074 | 1636 | 1990 | 2606 |

TEA: Triethyl aluminum
TIBA: Triisobutyl aluminum
*)Organoaluminum (mol)/racemic ethylenebis (1-indenyl) zirconium diphenoxide (mol)

INDUSTRIAL APPLICABILITY

The present invention can provide a production process of olefin polymer, high in polymerization activity, and carried out in the presence of a metallocene-base catalyst.

The invention claimed is:

1. A process for producing an olefin polymer, comprising:
   step (I) preliminarily polymerizing an olefin at 65° C. or lower in the presence of a preliminary polymerization catalyst prepared by bringing the following components (A), (B) and (C) into contact with each other, to produce a preliminary polymerization catalyst component (X); and
   step (II) polymerizing an olefin in the presence of a polymerization catalyst prepared by bringing the preliminary polymerization catalyst component (X) into contact with the following components (D) and (E), to produce an olefin polymer;
   wherein component (A) is metallocene-based complex,
   component (B) is a solid co-catalyst component in which a compound capable of ionizing the metallocene-based complex into an ionic complex is supported on fine particle support, component (C) is an organoaluminum compound represented by the general formula $R^1_3Al$, wherein $R^1$ is a linear hydrocarbon group of 1 to 8 carbon atoms, and each $R^1$ can be the same or different,
   component (D) is an organoaluminum compound represented by the general formula $R^2_3Al$, wherein $R^2$ is a branched hydrocarbon group of 3 to 8 carbon atoms, and each $R^2$ can be the same or different, and component (E) is an electron donating compound,
   wherein component (B) is produced by bringing diethyl zinc (component (a)), fluorinated phenol (component (b)), water (component (c)), fine inorganic particulate carrier (component (d)) and alkyl disilazane (component (e)) into contact with each other, and
   wherein the molar ratio of Al atom of the organoaluminum compound as component (C) to be contacted in the step (I) to a transition metal of the metallocene-based complex (component (A)) is 0.05 or more and less than 5.

2. The process for producing an olefin polymer according to claim 1, wherein the molar ratio of Al atom of the organoaluminum compound as the component (D) to be contacted in the step (II) to a transition metal derived from the metallocene-based complex (A) in the preliminary polymerization catalyst component (X) is 1 to 10,000.

3. The process for producing an olefin polymer according to claim 1, wherein the amount of the preliminary polymerization is 0.01 to 1000 g per 1 g of the component (B).

4. The process for producing an olefin polymer according to claim 1, wherein the component (C) is triethyl aluminum and the component (D) is triisobutyl aluminum.

5. The process for producing an olefin polymer according to claim 2, wherein the amount of the preliminary polymerization is 0.01 to 1000 g per 1 g of the component (B).

6. The process for producing an olefin polymer according to claim 2, wherein the component (C) is triethyl aluminum and the component (D) is triisobutyl aluminum.

7. The process for producing an olefin polymer according to claim 3, wherein the component (C) is triethyl aluminum and the component (D) is triisobutyl aluminum.

8. The process for producing an olefin polymer according to claim 5, wherein the component (C) is triethyl aluminum and the component (D) is triisobutyl aluminum.

* * * * *